United States Patent [19]

Kuhns

[11] Patent Number: 5,360,223
[45] Date of Patent: Nov. 1, 1994

[54] CAPPED WHEEL SPINDLE ASSEMBLY

[75] Inventor: Abe B. Kuhns, Arthur, Ill.

[73] Assignee: E-Z Trail, Inc., Arthur, Ill.

[21] Appl. No.: 28,958

[22] Filed: Mar. 10, 1993

[51] Int. Cl.⁵ .......................... B62D 7/06; B62D 7/16
[52] U.S. Cl. .................................................. 280/96.1
[58] Field of Search ...................... 280/95.1, 96.1; 411/369, 542

[56] References Cited

U.S. PATENT DOCUMENTS

| | | | |
|---|---|---|---|
| 873,147 | 12/1907 | Baldwin | 280/96.1 |
| 1,438,214 | 12/1922 | Brady | 280/96.1 |
| 1,705,630 | 3/1929 | Woolson | 280/96.1 |
| 2,582,455 | 1/1952 | Potter | 280/96.1 |
| 2,615,765 | 10/1952 | Venable | 280/96.1 |
| 2,761,347 | 9/1956 | McKee, Jr. | 411/369 |
| 3,500,712 | 3/1970 | Wagner | 411/369 |
| 4,690,418 | 9/1987 | Smith | 280/96.1 |
| 4,875,818 | 10/1989 | Reinwall | 411/369 |

FOREIGN PATENT DOCUMENTS 598611  2/1948  United Kingdom ............... 280/95.1

*Primary Examiner*—Karin L. Tyson
*Attorney, Agent, or Firm*—Lockwood, Alex, FitzGibbon & Cummings

[57] ABSTRACT

A wheel spindle assembly for a steerable vehicle chassis includes a vertically extending sleeve mounted at the end of a chassis rail of the vehicle for receiving a cylindrical wheel spindle for journaled rotation therein. A cup-shaped cap with downturned edges overlies the top of the sleeve and wheel spindle, and the cap is fixed to the spindle for rotation with it. The cap forms a sealing closure against the ingress of water and other contaminants through the top of the sleeve.

14 Claims, 2 Drawing Sheets

CAPPED WHEEL SPINDLE ASSEMBLY

BACKGROUND & SUMMARY OF THE INVENTION

The present invention relates to a steerable vehicle and, more particularly, to a capped wheel spindle assembly for such vehicle.

Towed vehicles which are towed by a towing vehicle, such as a tractor, are widely used in a number of applications, such as for example grain carts and the like in the agricultural field. These towed vehicles usually include a steering assembly at the front axle or rail of the chassis frame of the vehicle which steers the front wheels when the towing vehicle and the towed vehicle negotiate a turn.

Such steering assemblies typically include a towing assembly having a king pin which is fixed to the front axle or rail of the chassis, and a steering frame which is rotatably mounted to the king pin for rotation relative to it. The king pin may be mounted through the front rail or forward of the front rail. In either case a towing tongue may either be formed as part of the steering frame or more usually is movably mounted to the front thereof. The towing tongue has a hitch at its leading end for attachment to a hitch on the towing vehicle. The prior steering assemblies have also typically included conventional tie rods and ball joint mountings on the tie rods which are attached at one end to the steering frame and at the other end to a steering arm on the spindles upon which the steerable wheels are mounted. Thus, when the vehicle is to negotiate a turn, the steering frame rotates to the right or left about the king pin to cause the tie rods to turn the wheel spindles and wheels in one direction or the other to steer the vehicle.

The prior wheel spindles typically comprise a relatively large diameter heavy rod which has substantial strength to bear the load which is to be carried by the vehicle, and to withstand substantial forces which are exerted on the spindles particularly where the vehicle in to operate under off the road conditions and on uneven terrain as agricultural vehicles frequently do. In the prior wheel spindles, the rods usually have two portions which extend at right angles to each other. One portion extends generally horizontally to the wheel which is attached for rotation thereon, and the other portion extends vertically upwardly into a passage in a sleeve. The sleeve is welded to the end of the front chassis rail of the vehicle, whereby the spindle rotates in the sleeve passage as the vehicle is being steered. The spindle in these prior assemblies is typically held in the sleeve simply by a flat washer at the top of the sleeve and a bolt extending through the washer which is fixed to the top end of the spindle to hold the spindle in the sleeve and permit it to rotate therein.

Although such prior spindle assemblies are generally functional for their intended purpose, the simple washer construction does not seal the upper end of the sleeve against the ingress of contaminants, such as water and dirt. Thus, over a period of time, particularly where the vehicle has been parked outdoors as is typical in agricultural vehicles, water and other contaminants enter the sleeve and spindle assembly and cause rust and scoring which damage the assembly and can cause it to bind and become inoperative.

In the wheel spindle assembly of the present invention contamination of the assembly is substantially reduced, if not eliminated altogether while, at the same time, the assembly is strengthened against forces which are typically exerted on the assembly during use of the vehicle.

In one principal aspect of the present invention, a wheel spindle assembly for a steerable vehicle chassis includes a vertically extending sleeve having a cylindrical passage therein over substantially the length of the sleeve for receiving through the bottom of the sleeve a cylindrical wheel spindle for rotation in the passage. The internal surface of the sleeve in the passage defines a bearing surface for rotation of the wheel spindle relative to the surface, and a sealing closure is provided at the top of the sleeve for sealing the sleeve against the ingress of water and other contaminants through the top of the sleeve.

In another principal aspect of the present invention, the vertically extending sleeve is mounted at the end of a rail of the chassis, and a flat plate is positioned at the bottom of the sleeve which has an opening therethrough for the wheel spindle. The plate has a width greater than the cross-sectional dimension of the sleeve, and the plate is welded to the bottom of the sleeve. The plate has an opening therethrough for the wheel spindle, and the plate has a width greater than the cross-sectional dimension of the sleeve and is welded to the bottom of the sleeve and the underside of the chassis rail.

In still another principal aspect of the present invention, the sealing closure comprises a cap having an opening therethrough, and elongate fastener extending through the opening for holding the wheel spindle in the sleeve when it is journaled in the passage, and a seal for sealing the opening.

In still another principal aspect of the present invention, the last mentioned seal comprises a resilient gasket between the cap and the fastener.

In still another principal aspect of the present invention, the cap is rotatable relative to the top of the sleeve, and the fastener fixedly attaches the cap to the wheel spindle when the wheel spindle is journaled into the passage so that the cap rotates with the wheel spindle relative to the top of the sleeve.

In still another principal aspect of the present invention, the sealing closure or cap is cup-shaped having a portion which overlies the top of the sleeve and its passage, and a downturned edge about the perimeter of the overlying portion which extends downwardly from and around the top of the sleeve.

In still another principal aspect of the present invention, the downturned edge of the cap is spaced from the chassis rail, and the sleeve is welded to the chassis rail in the space.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

Figure 1:
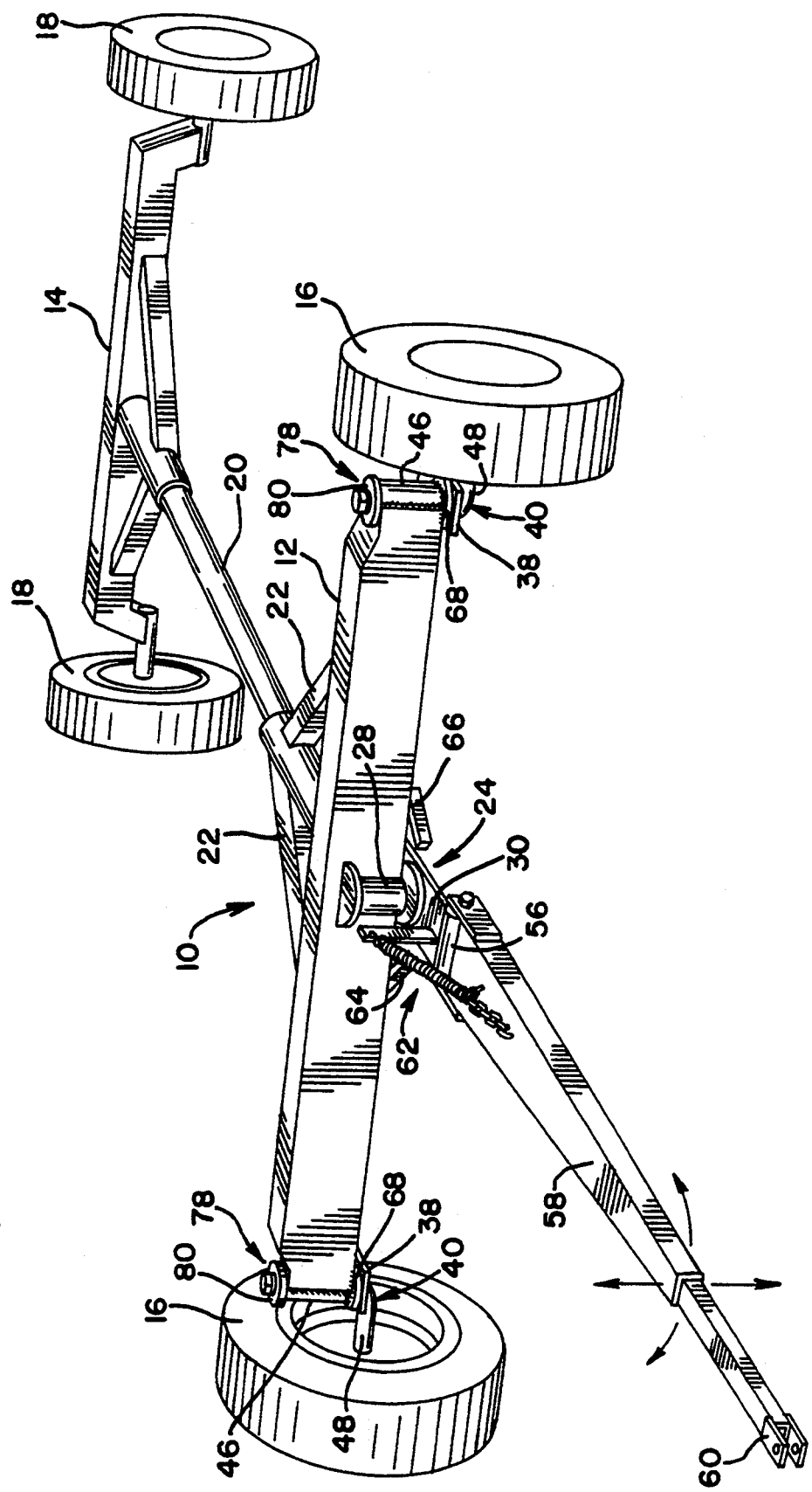
FIG. 1 is a perspective view of a steerable vehicle chassis including a preferred embodiment of wheel spindle assembly of the present invention.

A vehicle chassis is shown in FIG. 1 which includes a steering assembly which, in turn, includes a preferred embodiment of wheel spindle assembly constructed in accordance with the principles of the present invention.

As shown in FIG. 1 the chassis, generally 10, preferably comprises a pair of rails, including a front rail or axle 12 and a rear rail or axle 14. The rails 12 and 14 are longitudinally spaced from each other along the chassis and extend transversely thereof. Front wheels 16 are mounted for rotation at the ends of the front rail 12, and rear wheels 18 are mounted at the ends of the rear rail 14. The front wheels 16 are steerable as will be described in more detail to follow, whereas the rear wheels 18 need not be and are typically not steerable. The rails 12 and 14 are firmly coupled to each other by a center beam 20 to complete the chassis frame for the vehicle. In the single center beam construction shown, diagonal struts 22 are also preferably provided which extend between the center beam 20 and the front and rear rails 12 and 14 to strengthen the chassis frame. Although only a single center beam 20 is shown, it will be understood that more than one beam may be provided if desired, either in place of or in addition to the center beam 20.

Figure 2:
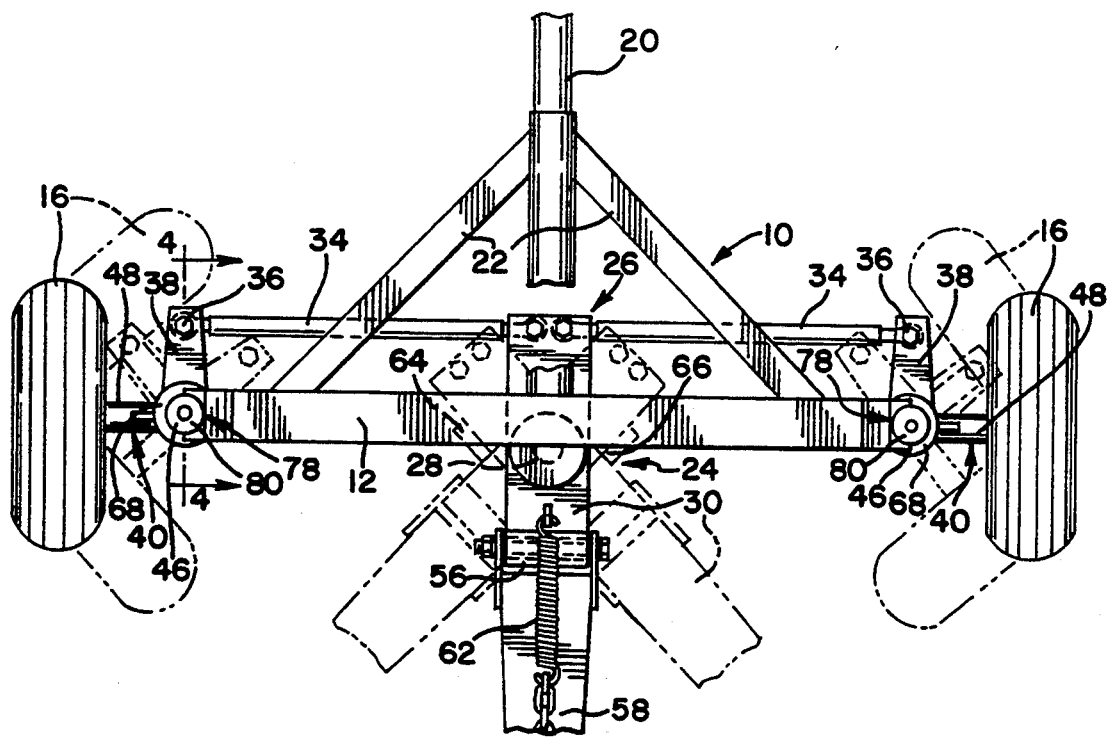
FIG. 2 is a broken plan view of the front rail of the chassis shown in FIG. 1, and showing the vehicle steering assembly including the preferred embodiment of wheel spindle assembly of the present invention with various steering positions indicated in dot and dash.

A towing assembly, generally 24, forms a part of an overall steering assembly 26, as best seen in FIG. 2, for steering the wheels 16 of the vehicle as it is being towed.

The towing assembly 24 generally comprises a vertically extending king pin 28 which preferably extends upwardly along a vertical axis. The king pin 28 is rigidly mounted to the front chassis rail 12 either to its front face, as shown in FIGS. 1 and 2, by welding the pin to the rail, or through the rail. The towing assembly 24 also includes a steering frame 30 which extends beneath the front chassis rail 12 and the pin 28. The steering frame 30 is preferably formed of a heavy gauge flat strong metal plate. The steering frame 30 is mounted to the bottom of the king pin 28 for rotation in a generally horizontal plane relative to the vertical axis of the king pin. The details of such mounting will not be described herein because they do not form a part of the present invention.

A pair of openings 32 are positioned in and to the rear of the steering frame 30 and to the rear of the front rail 12, as best seen in FIG. 2. The openings 32 provide mounting sites for tie rods 34 of the steering assembly 26. The tie rods 34 have conventional ball and socket end mounts 36 at each end. The ball and socket mounts on the inner ends of the tie rods 34 are mounted in the respective openings 32 to the steering frame, and the ball and socket mounts on the outer ends of the tie rods 34 are similarly mounted in openings through steering arms 38 which are fixed to rotatable wheel spindles 40 on each of the wheels 16.

Figure 3:
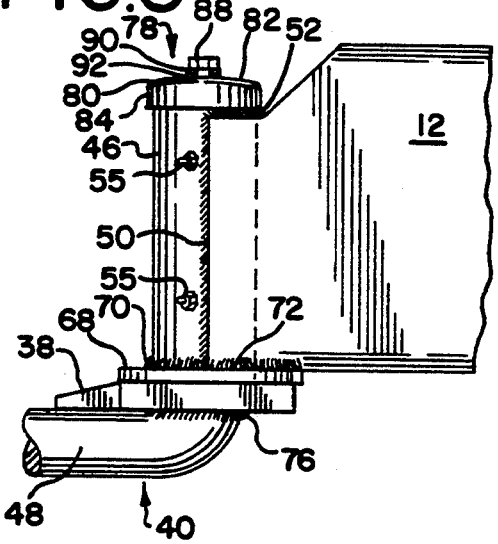
FIG. 3 is a broken enlarged front view of the left wheel spindle assembly of the preferred embodiment of the invention, as shown in FIG. 2.
Figure 4:
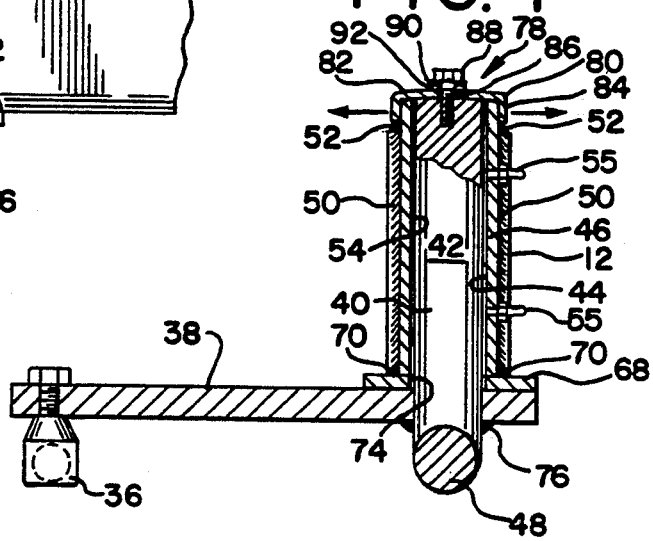
FIG. 4 is a broken cross-sectioned side elevation view of the preferred embodiment of wheel spindle assembly of the invention, as viewed substantially along line 4—4 of FIG. 2.

The wheel spindles 40 preferably have two portions which extend at right angles to each other with the vertical portion 42 of each spindle extending upwardly, as shown in FIG. 4, in journaled relationship into a passage 44 through a cylindrical spindle sleeve 46, and the horizontal portion 48 extending to the wheel 16 and about which the wheel rotates. The spindle sleeves 46 are welded at the outer ends of the front rail 12 by a vertical weld 50 on each side of the sleeve, as best seen in FIGS. 3 and 4, and by a horizontal weld 52 adjacent the top of the sleeves 46. Thus, the vertical portion 42 of the wheel spindles 40 rotate in the passage 44 of the sleeve 46, and the inner surface 54 of the sleeve defines a bearing surface for rotation of the wheel spindle to steer the wheel 16. Suitable grease fittings 55 are preferably positioned along the sleeve 46 to introduce a lubricant to the passage 44. When the steering frame 30 is rotated in the horizontal plane about the king pin 28, the wheels 16 will be steered by way of the tie rods 34 and steering arms 38 as is typical in a steering assembly.

A hitching assembly generally 56 is also fixed at the other end of the steering frame 30, as best seen in FIGS. 1 and 2. The hitching assembly 56 hingedly mounts a towing tongue 58 for movement up and down relative to the steering frame 30, as shown by the vertical arrows in FIG. 1. The leading end of the towing tongue 58 also carries a hitch 60 for hitching the front of the tongue to a hitch on the towing vehicle (not shown).

A spring assembly, generally 62, is also preferably provided, as shown in FIGS. 1 and 2, to adjustably tension the vertical movement of the tongue 58. A pair of stops 64 and 66 are also provided to limit the movement of the steering frame 30 to the right and left, as shown in dot and dash in FIG. 2.

Returning to the description of the wheel spindle assembly and with particular reference to FIGS. 3 and 4, an enlarged plate, and in the preferred embodiment an enlarged substantially flat washer 68, has its top side welded at weld 70 to the bottom end of the sleeve 46. The width or diameter of the washer 68 is larger than the cross-sectional dimension of the sleeve 46 to accommodate the weld 70, and also to extend beneath the underside of the front rail 12, as best seen in FIG. 3. The latter also permits the top side of the washer 68 to be welded out to its perimeter along the front and rear faces of the front rail 12, by welds 72, one of which is shown in FIG. 3. Thus, the washer 68 and the welds 70 and 72 substantially strengthen the sleeve 46 against splitting and other damage which might occur during use of the vehicle, for example when one of the wheels 16 strikes and rides over an obstruction. In such instance, outwardly directed forces, such as depicted by the arrows in FIG. 4, are exerted by the vertical portion 42 of the wheel spindle 40 on the sleeve 46 which may tend to split the sleeve, particularly where the sleeve has a seam, and/or to break the welds 50.

The washer 68 also has an opening 74 therethrough, as shown in FIG. 4, which is preferably of substantially the same size as the diameter of the passage 44 in the sleeve 46 to receive the vertical portion 42 of the wheel spindle 40. The forward end of the steering arm 38 is welded by weld 76 to the wheel spindle 40 and the upper surface thereof is in contact with the undersurface of the washer 68. The washer 68 thereby provides a bearing surface against which the steering arm 38 rotates as the vehicle is being steered.

An important feature of the present invention is a sealing closure, generally 78, which is provided at the top of the sleeve 46. The sealing closure 78 preferably comprises a cup-shaped cap 80 having a major portion 82 which is preferably domed and which overlies the top end of the vertical portion 42 of the rotatable wheel spindle 40, and the top end of the sleeve 46. The perimeter of the cap has a downturned edge 84, as best seen in FIGS. 3 and 4, which extends downwardly from the domed overlying portion 82 of the cap and around the top of the sleeve 46. The downturned edge 84 preferably closely fits the outer surface of the top of the sleeve 46, but permits rotation of the cap 80 relative to the sleeve.

The cap 80 includes an opening 86 in the top for receiving a fastener bolt 88 through the opening, and the bolt 88 is threadedably attached, as shown in FIG. 4, to the top of the vertical portion 42 of the wheel spindle 40. Thus, the fastener bolt 88 fastens the top of the wheel spindle 40 to the cap 80 for rotation of the cap with the wheel spindle, and the cap and bolt hold the vertical portion 42 of the wheel spindle in the passage 44 during operation.

A seal is also positioned in the preferred embodiment between the head of the fastener bolt 88 and the cap 80. The seal preferably comprises a rigid washer portion 90 against which the head of the fastener bolt 88 may bear, and a resilient gasket 92 for sealing the opening 86 against the ingress of contaminants.

From the foregoing it will be seen that the sealing closure 78 of the present invention securely seals the top of the sleeve 46 against the ingress of contaminants, such as water and dirt, both during operation as well as when of the vehicle is not in use. This is particularly important in agricultural vehicles which are typically parked outdoors for long periods of time and are exposed to the weather. In addition, the downturned edge 84 of the cap 80 may provide at least some further strengthening of the top of the sleeve 46 against forces which may be exerted on the sleeve during use, as shown by the arrows in FIG. 4.

It will be understood that the embodiment of the present invention which has been described is merely illustrative of one of the applications of the principles of the invention. Numerous modifications may be made by those skilled in the art without departing from the true spirit and scope of the invention.

I claim:

1. A wheel spindle assembly for a steerable vehicle chassis, said assembly comprising:
   an elongate generally horizontally extending chassis rail adapted to receive steerable wheels adjacent its ends;
   a vertically extending sleeve mounted at an end of the chassis rail, said sleeve having a cylindrical passage therein over substantially the length of said sleeve for receiving a cylindrical wheel spindle for journaled rotation therein;
   a enlarged plate at the bottom of said sleeve, said plate having an opening therethrough for the wheel spindle, and having a width greater than the cross-sectional dimension of said sleeve, said plate being welded to the bottom of said sleeve and the underside of said chassis rail; and
   a sealing closure at the top of said sleeve for sealing said passage against the ingress of water and other contaminants through the top of said sleeve.

2. The wheel spindle assembly of claim 1, wherein said sealing closure comprises a cap having an opening therethrough, an elongate fastener extending through said opening for holding the wheel spindle in said sleeve when it is journaled in said passage, and sealing means for sealing said opening.

3. The wheel spindle assembly of claim 2, wherein said sealing means comprises a resilient gasket between said cap and said fastener.

4. The wheel spindle of claim 2, wherein said cap is rotatable relative to the top of said sleeve, and said fastener fixedly attaches said cap to the wheel spindle when the wheel spindle is journaled into said passage so that said cap rotates with the wheel spindle.

5. The wheel spindle of claim 1, wherein said sealing closure is rotatable relative to the top of said sleeve.

6. The wheel spindle of claim 1, wherein said sealing closure comprises a cup-shaped cap having a portion which overlies the top of said sleeve and its passage, and a downturned edge about the perimeter of said overlying portion which extends downwardly from and around the top of said sleeve.

7. The wheel spindle of claim 6, wherein said cap includes an opening therethrough, an elongate fastener extending through said opening for holding the wheel spindle in said sleeve when it is journaled in said passage, and sealing means for sealing said opening.

8. The wheel spindle of claim 7, wherein said sealing means comprises a resilient gasket between said cap and said fastener.

9. The wheel spindle of claim 7, wherein said cap is rotatable relative to the top of said sleeve, and said fastener fixedly attaches said cap to the wheel spindle when the wheel spindle is journaled into said passage so that said cap rotates with the wheel spindle.

10. The wheel spindle of claim 6, wherein said downturned edge of said cap is spaced from said chassis rail, and said sleeve is welded to said chassis rail in said space.

11. A wheel spindle assembly for a steerable vehicle chassis, said assembly comprising:
    a vertically extending sleeve having a cylindrical passage therein over substantially the length of said sleeve for receiving through the bottom of the sleeve a cylindrical wheel spindle for rotation in the passage, and a bearing in said sleeve for rotation of said wheel spindle relative to said sleeve; and
    a sealing closure at the top of said sleeve for sealing said passage against the ingress of water and other contaminants through the top of said sleeve, said sealing closure comprising a cap which is fixed to said wheel spindle and rotates with said spindle relative to said sleeve, said cap being cup-shaped and having a portion which overlies the top of said sleeve and its passage, and a downturned edge about the perimeter of said overlying portion which extends downwardly from and around the top of said sleeve.

12. The wheel spindle assembly of claim 11 wherein said cap has an opening therethrough, an elongate fastener extending through said opening for fixing said cap to said wheel spindle and holding the wheel spindle in said sleeve when it is rotatably positioned in said passage, and sealing means for sealing said opening.

13. The wheel spindle assembly of claim 12 wherein said sealing means comprises a resilient gasket between said cap and said fastener.

14. The wheel spindle assembly of claim 1, wherein said enlarged plate is substantially flat.

* * * * *